United States Patent
Ramakesavan

(10) Patent No.: US 6,816,286 B2
(45) Date of Patent: *Nov. 9, 2004

(54) DATA FORWARDING SYSTEM

(75) Inventor: Sundaram Ramakesavan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/430,502

(22) Filed: May 8, 2003

(65) Prior Publication Data

US 2003/0189723 A1 Oct. 9, 2003

Related U.S. Application Data

(63) Continuation of application No. 09/198,915, filed on Nov. 24, 1998.

(51) Int. Cl.[7] .............................................. H04N 1/100
(52) U.S. Cl. ...................... 358/405; 358/1.15; 358/442; 358/407; 379/100.09
(58) Field of Search ................................. 358/1.15, 405, 358/442, 468, 479, 404, 539, 407; 379/100.09

(56) References Cited

U.S. PATENT DOCUMENTS

| | | | |
|---|---|---|---|
| 3,726,992 A | 4/1973 | Eguchi et al. ............... | 178/5.6 |
| 5,414,773 A | 5/1995 | Handelman .................. | 380/49 |
| 5,742,905 A | 4/1998 | Pepe et al. .................. | 455/461 |
| 5,819,250 A | 10/1998 | Trader et al. .................. | 707/1 |
| 5,847,844 A | 12/1998 | Minamizawa ............... | 358/442 |
| 6,052,208 A | 4/2000 | Lee ............................ | 358/468 |
| 6,628,428 B1 * | 9/2003 | Ramakesavan ............. | 358/400 |

OTHER PUBLICATIONS

1998 STAR, TR–29 Facsimile Systems and Equipment; 2003 Telecommunications Industry Association (TIA); http://www.tiaonline.org/standards/star/98.

* cited by examiner

*Primary Examiner*—Madeleine Nguyen
*Assistant Examiner*—Negussie Worku
(74) *Attorney, Agent, or Firm*—Trop, Pruner & Hu, P.C.

(57) ABSTRACT

A data forwarding system allows receivers with limited capabilities to receive information that was transmitted in a format which the user could not otherwise receive. For example, a receiver which does not include a fax modem may receive faxes which are transmitted to a station. The station receives the fax transmission and transmits it on to the receiver in a format compatible with the receiver's hardware and software. In addition, transactions which occur at a variety of sites may be transmitted to a remote station which then forwards the information about the transactions to the user's receiver. At the receiver, the information may be analyzed using conventional accounting software.

20 Claims, 5 Drawing Sheets

DATA FORWARDING SYSTEM

This is a continuation of U.S. patent application Ser. No. 09/198,915, entitled "DATA FORWARDING SYSTEM," filed on Nov. 24, 1998.

BACKGROUND

The present invention relates generally to electronic devices which may receive data messages such as computer systems and particularly to computer systems adapted for use in the home.

Many homes do not have a telecopy or facsimile machine. Some homes include computer systems and some of these computer systems may include fax modems which are capable of transmitting and receiving data from the computer over a telephone line in the form of a telecopy or a fax. However, a large number of potential receivers of telecopies are unable to receive those telecopies at home.

Some people avoid these problems by having telecopies sent to friends, family and to their office telecopy machine. However, it would be desirable to enable a telecopy system in which a wider universe of users could receive telecopies.

One advantageous home computer system is the set-top computer system. A set-top computer system works together with a conventional television receiver. In some implementations, the set-top computer system may sit on top of the television receiver, thus the name "set-top" computer system. The set-top computer system may provide many of the same functions available with conventional computer systems. Instead of using a separate monitor, a television receiver may be used to display information. However, many set-top computer systems do not come equipped with a fax modem and thus, receipt of faxes is still not possible.

Thus, there is a continuing need for ways to provide additional data services.

SUMMARY

In accordance with one embodiment, a method of transmitting a fax to a receiver that does not include a fax modem includes receiving a fax over a fax modem. The intended addressee of the fax is recognized. A data transmission is transmitted to the receiver that includes the information that was contained in the fax.

DETAILED DESCRIPTION

Figure 1:
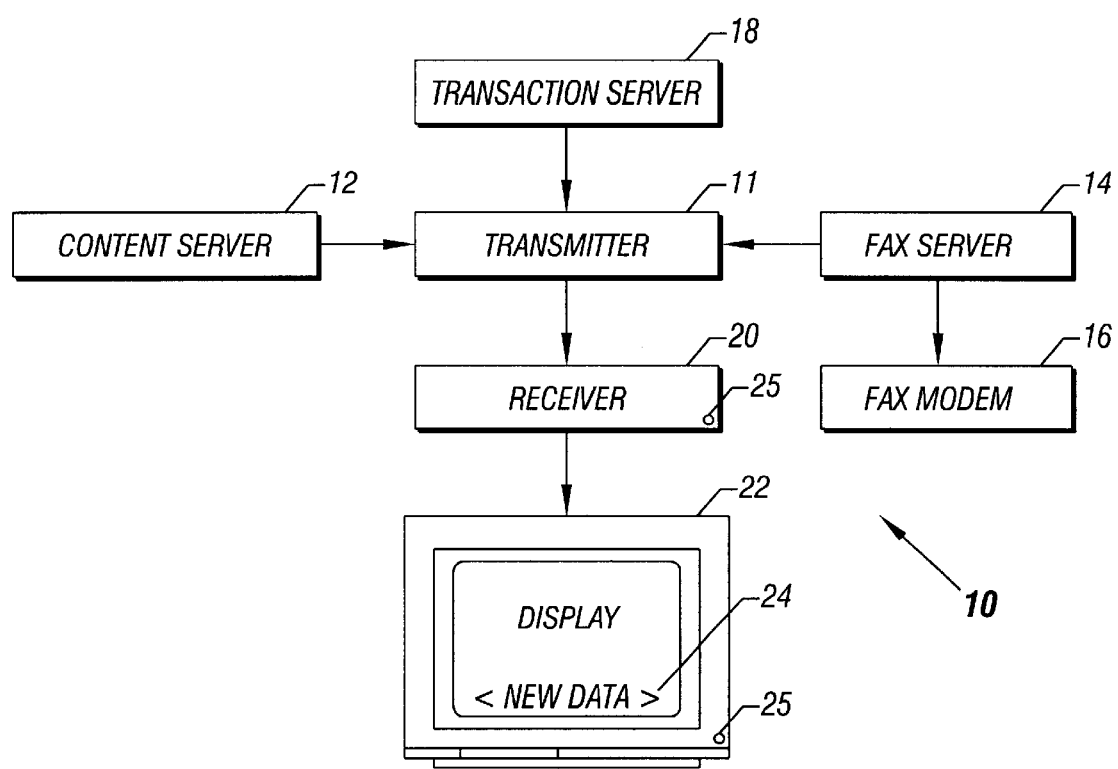
FIG. 1 is a block diagram of a system for providing data forwarding services in accordance with one embodiment of the present invention.

A data forwarding station 10, shown in FIG. 1, may include a transmitter 11 for transmitting data to one or more receivers 20 which may be open television broadcast receivers, each of which may be assigned a unique identification. The transmitter may transmit using one or more of a variety of transports including conventional wireless broadcast, cable television broadcast, satellite television broadcast, and other available transports.

The receiver 20 may be a conventional computer system. In some embodiments, the receiver 20 may be a set-top personal computer system using a television receiver 22 as its display. However, in other embodiments, conventional computer systems using monitors may be provided. The receiver 20 may receive analog or digital television broadcasts.

The transmitter 11 may receive content from a content server 12. The content server 12 may, for example, provide television programming for transmission by the transmitter 11. In addition, the server 12 may provide software such as script or programmatic logic which may be transmitted by the transmitter.

The transmitter 11 may also transmit data which is received by a fax server 14 from a fax modem 16. The fax modem 16, adapted to receive faxes (sometimes called telecopies or facsimile transmissions), is conventionally coupled to one or more telephone lines to receive incoming telecopies. The fax server provides the electronic data to the transmitter 11 which may transmit it over an available transport to the receiver 20.

The transaction server 18 may also communicate with a plurality of stations to receive information about various transactions that the user of a particular receiver 20 may have undertaken. Information, received from a variety of sources and associated with a particular receiver, may then be transferred to the transmitter 11 for transmission to the particular receiver.

The station 10 may augment the data reception capabilities of the receiver 20. For example, the receiver 20 may not include a fax modem. Thus, the user of the receiver 20 may be unable to receive faxes. However, faxes may be transmitted by a third party to the station 10 and particularly to the fax modem 16. The fax modem 16, in conjunction with the fax server 14, may provide the fax to the transmitter for transmission using an available transport medium to the receiver 20. Thus, even though the receiver 20 may not have the associated hardware and software to receive telecopies, the telecopied information may be provided to the receiver in another form, and may be displayed on the display 22.

Figure 2:
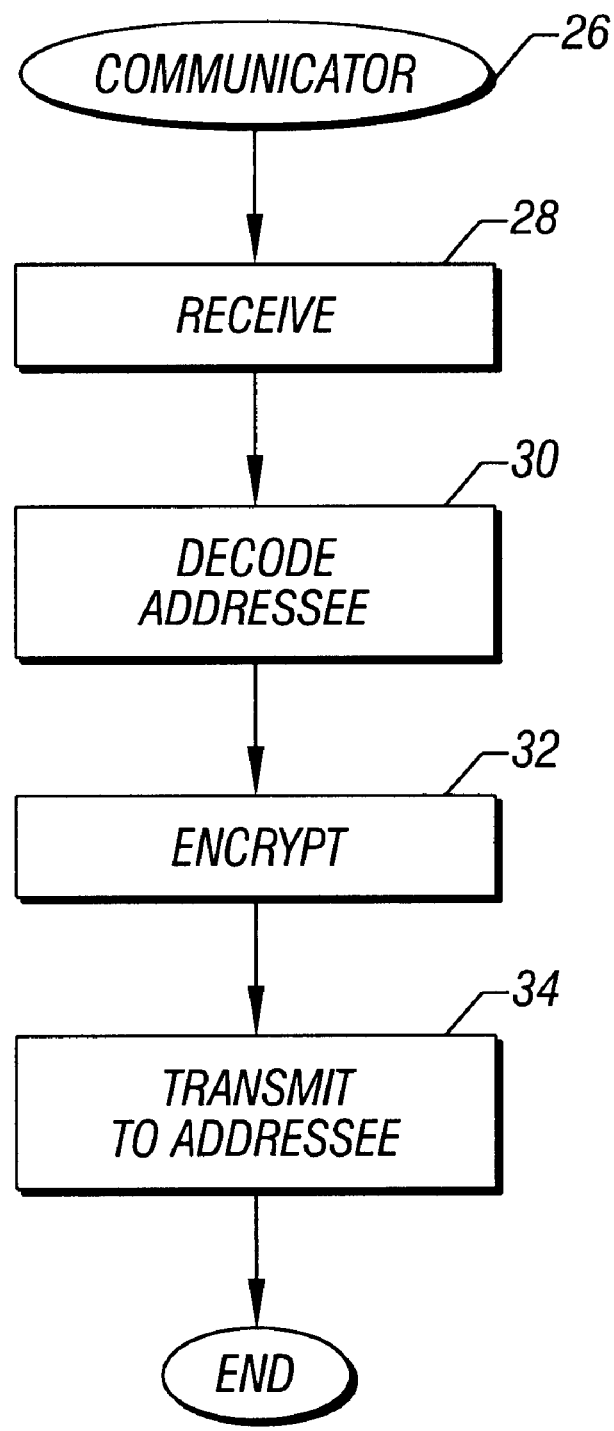
FIG. 2 is a flow chart for software that may be used with the transaction server or the fax server of the system shown in FIG. 1.

Turning now to FIG. 2, software 26 enables communication with the receiver 20 from third party sources. The station 10 receives a data transmission intended for a particular receiver 20 as indicated at block 28. This transmission may be, for example, a fax which is received by the fax modem. It may also include transactional information received over one or more available transports by the transaction server 18.

The intended addressee of the data transmission received by the station 10 is decoded as indicated at block 30. This may be done by providing each of a plurality of receivers with a particular address or identifier which then may be detected in the information contained in the fax, for example. For example the data contained in the fax may be parsed and scanned using optical character recognition to identify a particular number which is associated with a particular receiver.

Data corresponding to a particular receiver may be identified in the facsimile transmission, for example by comparing the data in the facsimile transmission with data in a database of available user identifiers. The entire communication may then be encrypted, as indicated in block 32, and transmitted, as indicated in block 34, by the transmitter 11 to the intended addressee.

For example, where the data transmission is a telecopy intended to be received by the receiver 20, the station 10 may receive that transmission over a telephone line, and provide it to the user of the receiver 20 in a form that the receiver is able to handle. For example, in one implementation, the receiver 20 may be connected to receive broadcasts of television programming from the transmitter 11. The facsimile may be transmitted with the television content information (for example as part of the vertical blanking interval (VBI)), provided by the content server 12 for receipt by the receiver 20.

Only the intended addressee is able to decode the encrypted message. For example, the encryption may require an appropriate user identifier provided by the appropriate user's receiver, to enable decryption.

When the receiver 20 receives the transmission, a prompt 24 on the display 22 may be activated indicating that data has been received. The user may then cause the data to appear on the display. This may be done in a number of ways, but one convenient way is to mouse click on the new prompt 24 causing the data to appear on the display screen.

The software to allow the receiver 20 to handle the data transmission may be resident on the receiver 20 or may be transmitted in the form of script, for example, by the transmitter 11. Thus, upon receipt, the data transmission may activate a prompt which causes the display to advise the user of an incoming data transmission. The user then can view the transmission as desired. In addition, a light indicator may be provided in connection with the receiver 20 so that even when the display 22 is not operating, the user may be advised of the receipt of a data transmission.

Figure 3:
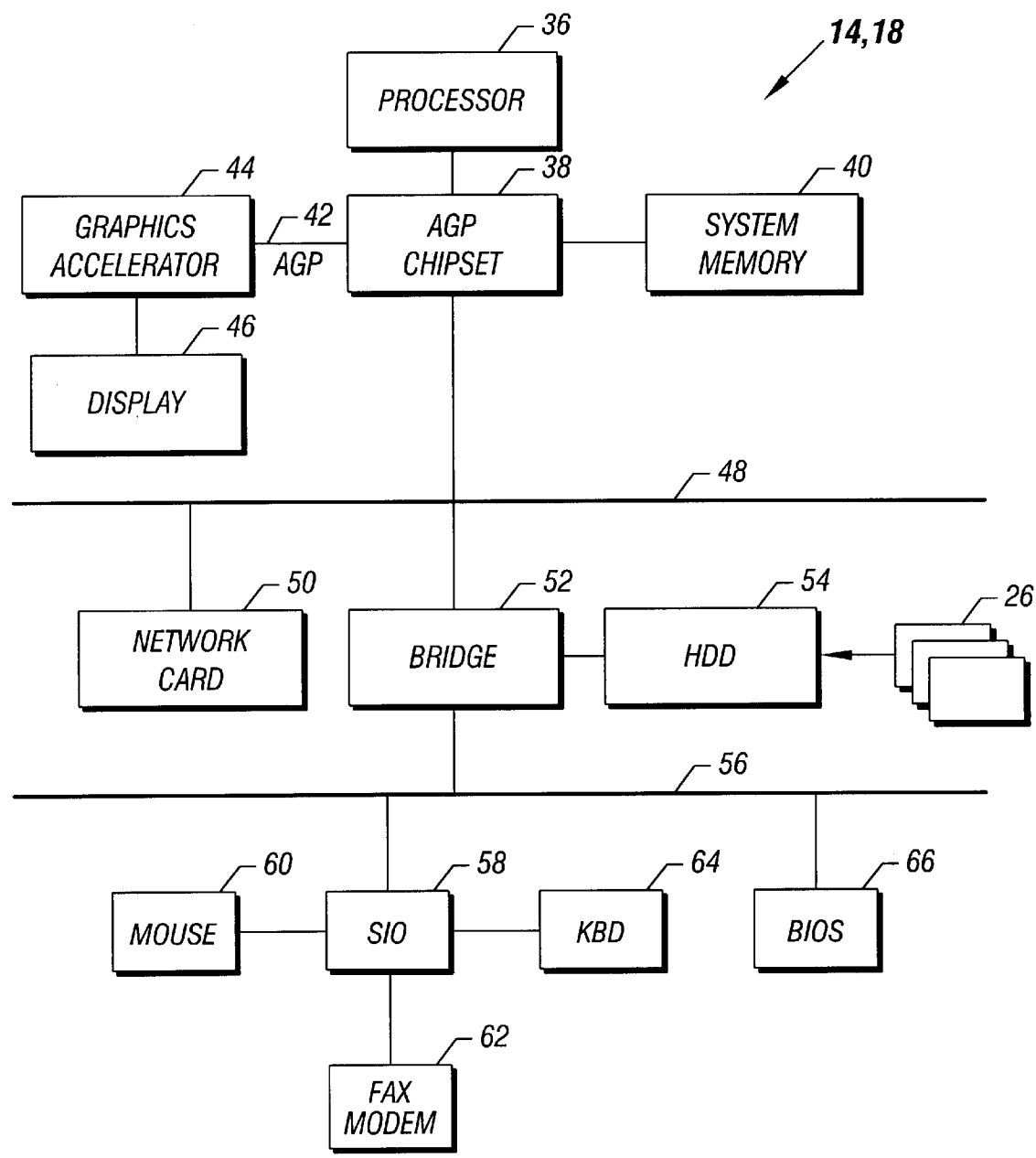
FIG. 3 is a block diagram showing one potential implementation for the fax server or transaction server shown in FIG. 1.

Referring now to FIG. 3, an example of an arrangement for implementing the fax server 14 and transaction server 18 is illustrated. Two different devices may be used to implement each server 14 or 18 or a single server may be utilized to provide both functions.

The server 14 or 18 may include a processor 36 which in some embodiments may be coupled to an accelerated graphics port (AGP) chipset 38. The chipset 38 in turn may be coupled to system memory 40 and an AGP bus 42. The bus 42 is in turn coupled to a graphics accelerator 44 which may be coupled to a display 46.

The chipset 38 may also be coupled to a primary bus 48 which in turn is coupled to a network card 50. The network card may enable communications among the servers 12, 14 and 18 and the transmitter 11 which in some embodiments is also a server as well. Thus, a network configuration allows communications among the various devices implementing the station 10.

The bus 48 may be coupled to a bridge 52 which in turn is coupled to a hard disk drive 54. The hard disk drive 54 may include one or more software programs for implementing the necessary functions of the server. For example, the software 26 may be provided on the hard disk drive 54.

The bridge 52 is coupled to another bus 56 in the illustrated embodiment. The bus 56 may in turn be coupled to a basic input/output system (BIOS) 66 and a serial input/output (SIO) interface 58. Interface 58 in turn may be coupled to keyboard 64, a mouse 60 and the fax modem 62 in the case of the fax server 14. The fax modem 62 may also include conventional modem capabilities and thus, may be adequate as a modem for receiving telephone data transmissions at the transaction server 18. However, in some embodiments, the fax modem 62 may be replaced with a high speed modem to receive transactions from a variety of sources.

Figure 4:
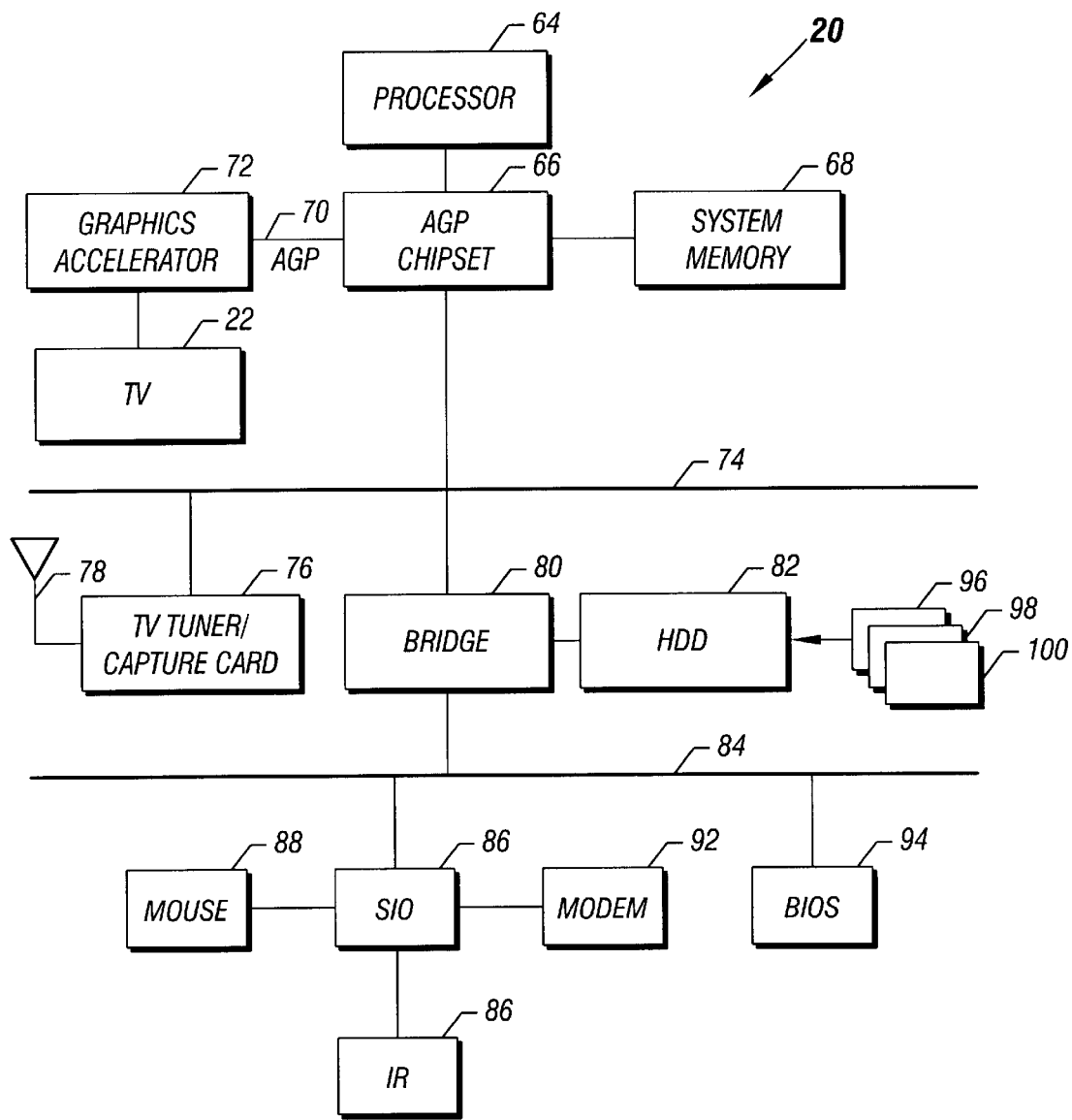
FIG. 4 is a block diagram showing one potential implementation of the receiver shown in FIG. 1.

Turning now to FIG. 4, an example of a system that may be used as a receiver 20 is illustrated. The receiver 20 may include a processor 64 coupled to an accelerated graphics port (AGP) chipset 66. The chipset 66 may be coupled to system memory 68 and the accelerated graphics port bus 70. The bus 70 in turn may be coupled to a graphics accelerator 72, also coupled to a television receiver 22.

The chipset 66 may also be coupled to a bus 74 that receives a TV tuner/capture card 76. The card 76 may be coupled to a television antenna 78.

The bus 74 is coupled to a bridge 80 which in turn is coupled to a hard disk drive 82. The hard disk drive 82 may have the software 96 (to be described hereinafter), and additional software programs 98 and 100. One software program useful in some embodiments is an accounting software package such as the Quicken software program available from Intuit Corporation. Other accounting software could be utilized as well. The software 100 may be script transmitted from the transmitter 11 in order to implement the fax system described previously.

The bridge 80 may in turn be coupled to another bus 84 which supports a serial output interface 86 and a BIOS 94. The interface 86 may be coupled to a modem 92, a mouse 88 and an infrared interface 90. The infrared interface 90 may receive infrared transmissions from a conventional television remote control. The interface 90 may be implemented in accordance with the standards set forth in the Infrared Data Association (IrDA) specifications (such as the Serial Infrared Link Access Protocol version 1.0, Jun. 23, 1994 which may be found at {www.irda.org}).

Figure 5:
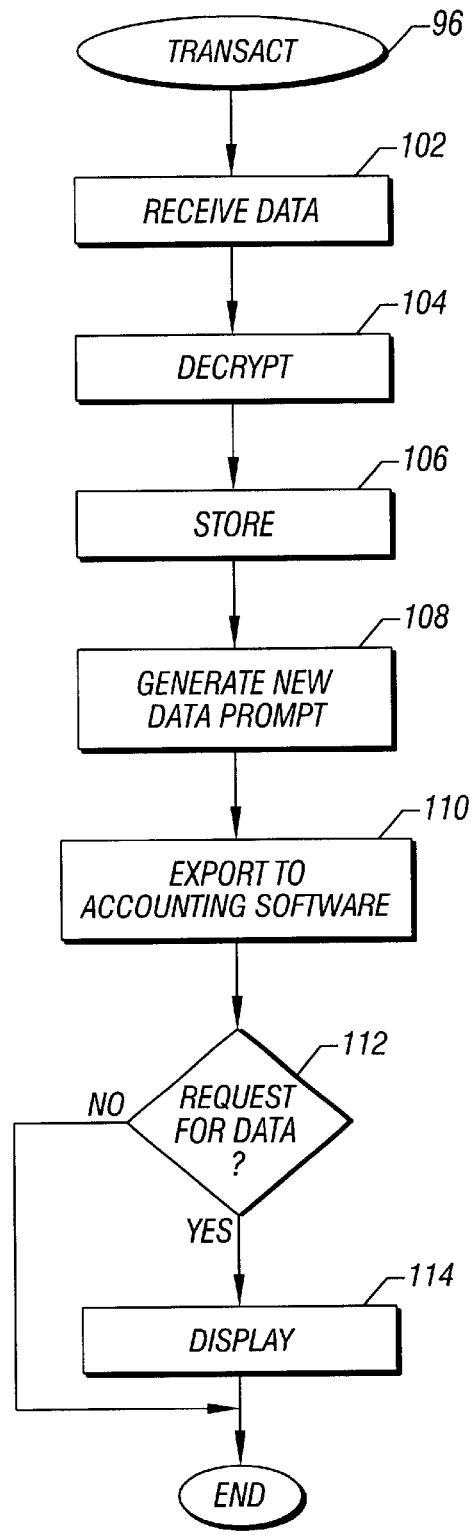
FIG. 5 is a flow diagram for software that may be included on the receiver shown in FIG. 1 in another embodiment of the present invention.

Referring now to FIG. 5, a system for allowing various transactions, such as financial transactions, to be reported by the station 10 to the receiver 20 from a variety of sources is illustrated. For example, every time the user uses a given credit card, the user may be queried by a client of the station 10 as to whether the user wishes to have the transaction reported to the user's home receiver 20. A variety of vendors and service providers may then provide reports of transactions which go not only to the credit card processor, but also are reported to the user's home receiver 20 through the station 10. The user may then manipulate these transactions and provide desired reports, for example using conventional accounting software programs.

The software 96 begins by receiving data from the transmitter 11, as indicated in block 102. The data may need to be decrypted as indicated in block 104 and if so, an appropriate decryption algorithm is utilized to decrypt the transmission. In some embodiments it may be desirable to store the data transmission as indicated in block 106.

Once the data is received, a prompt may be generated on the user's display such as the prompt 24 or the prompt 25 on the receiver 20. This allows the user of the receiver to immediately display the information if the user is currently using the display, for example to watch a television broadcast. Alternatively, an indication may be provided on the receiver 20 so the user may be advised that a transaction has posted even if the display 22 is not being operated.

The software 96 may then automatically export the data to an accounting software package where it may be included with the user's personal finance reports (block 110). For example, every time the user buys something or pays for services, the transaction may be reported through the station 10 to the receiver 20 and exported to an accounting software package for inclusion into a cash flow accounting for the user. This accounting may include detailed reports about how the user spends his or her money and provide information about available funds. In this way, the user can get relatively prompt information about how much the user is spending. This information may be used in financial planning.

Next, the software 96 determines whether or not there is a request for the data by the user, as indicated in diamond 112. For example, in some embodiments, the user can mouse click on the new data indication 24 (see FIG. 1) and the transmission is caused to appear on the display 22, as indicated at block 114. Otherwise the flow may end or it may cycle back to the beginning.

The transactions may be transmitted by the transmitter over a variety of transports including those currently used to transmit video, including for example, television programming, such as cable, broadcast, and satellite transmission systems. The transactional information may, in some embodiments, be transmitted with television content, for example using the vertical blanking interval.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of transmitting a fax comprising:
   receiving at a first receiver a fax over a fax modem wherein the fax is intended for one of a plurality of second receivers;
   recognizing the intended addressee of said fax at the first receiver; and
   transmitting a data transmission in non-fax format from the first receiver the data transmission including the information contained in the fax to the intended second receiver that does not require a fax modem to decode the data transmission.

2. The method of claim 1 further including transmitting television content with said data transmission.

3. The method of claim 1 further including encrypting said data transmission.

4. The method of claim 1 further including activating an indicator to notify the receiver that a data transmission has been provided.

5. The method of claim 2 wherein transmitting includes transmitting said data transmission as part of the vertical blanking interval in a television broadcast.

6. The method of claim 2 wherein transmitting including transmitting said data transmission as part of a digital television broadcast.

7. The method of claim 1 wherein transmitting includes transmitting information about financial transactions with said data transmission.

8. A method of transmitting a fax comprising:
   receiving a fax over a fax modem;
   determining the intended receiver of the received fax;
   converting the fax data into non-fax format data;
   transmitting the non-fax format data by wireless signals to the intended receiver;
   receiving the non-fax format data by the intended receiver wherein the receiver does not require a fax modem to decode the non-fax format data in the wireless signals; and
   displaying the fax data on a display coupled to the intended receiver.

9. The method of claim 8 wherein transmitting the non-fax data includes transmitting the non-fax data in a vertical blanking interval of a television signal.

10. The method of claim 8, wherein transmitting the non-fax data including transmitting the non-fax data as part of a digital television broadcast.

11. An article comprising a medium for storing instructions that cause a computer to:
    receive at a first receiver a fax over a fax modem wherein the fax is intended for one of a plurality of second receivers;
    recognize the intended addressee of said fax at the first receiver; and
    transmit a data transmission in non-fax format from the first receiver the data transmission including the information contained in the fax to the intended second receiver that does not require a fax modem to decode the data transmission.

12. The article of claim 11 further including instructions that cause a computer to transmit television content with said data transmission.

13. The article of claim 12 to transmit includes instructions that cause a computer to transmit said data transmission as part of the vertical blanking interval in a television broadcast.

14. The article of claim 12 to transmit includes instructions that cause a computer to transmit said data transmission as part of a digital television broadcast.

15. The article of claim 11 further including instructions that cause a computer to encrypt said data transmission.

16. The article of claim 11 further including instructions that cause a computer to activate an indicator to notify the receiver that a data transmission has been provided.

17. The article of claim 11 to transmit includes instructions that cause a computer to transmit information about financial transactions with said data transmission.

18. An article comprising a medium for storing instructions that cause a computer to:
    receive a fax over a fax modem;
    determine the intended receiver of the received fax;
    convert the fax data into non-fax format data;
    transmit the non-fax format data by wireless signals to the intended receiver;
    receive the non-fax format data by the intended receiver wherein the receiver does not require a fax modem to decode the non-fax format data in the wireless signals; and
    display the fax data on a display coupled to the intended receiver.

19. The article of claim 18 to transmit the non-fax data includes instructions that cause a computer to transmit the non-fax data in a vertical blanking interval of a television signal.

20. The article of claim 18 to transmit the non-fax data includes instructions that cause a computer to transmit the non-fax data as part of a digital television broadcast.

* * * * *